United States Patent
Ishihara

(10) Patent No.: US 8,026,683 B2
(45) Date of Patent: Sep. 27, 2011

(54) MOTOR CONTROLLER

(75) Inventor: Hidenori Ishihara, Hamamatsu (JP)

(73) Assignee: Asmo Co., Ltd. (JP)

( * ) Notice: Subject to any disclaimer, the term of this patent is extended or adjusted under 35 U.S.C. 154(b) by 431 days.

(21) Appl. No.: 12/337,773

(22) Filed: Dec. 18, 2008

(65) Prior Publication Data

US 2009/0160385 A1    Jun. 25, 2009

(30) Foreign Application Priority Data

Dec. 21, 2007 (JP) ................. 2007-330572
Sep. 17, 2008 (JP) ................. 2008-238401

(51) Int. Cl.
*H02P 7/00* (2006.01)

(52) U.S. Cl. .... 318/432; 318/442; 318/460; 318/400.02

(58) Field of Classification Search ................. 318/254, 318/266, 432, 442, 460, 466, 400.02
See application file for complete search history.

(56) References Cited

U.S. PATENT DOCUMENTS

| | | | |
|---|---|---|---|
| 6,450,287 B1 * | 9/2002 | Kurishige et al. | 180/446 |
| 7,429,847 B2 * | 9/2008 | Yamada et al. | 318/799 |
| 2001/0022249 A1 * | 9/2001 | Yoshida | 180/446 |
| 2004/0007999 A1 * | 1/2004 | Kushion et al. | 318/442 |
| 2006/0015226 A1 * | 1/2006 | Bernzen et al. | 701/41 |
| 2006/0145639 A1 * | 7/2006 | Song et al. | 318/254 |
| 2007/0096672 A1 * | 5/2007 | Endo et al. | 318/432 |
| 2007/0138880 A1 * | 6/2007 | Romenesko et al. | 310/66 |
| 2008/0067960 A1 * | 3/2008 | Maeda et al. | 318/400.02 |
| 2008/0116832 A1 * | 5/2008 | Yamada et al. | 318/460 |

FOREIGN PATENT DOCUMENTS

JP    2007001366 A    1/2007

* cited by examiner

*Primary Examiner* — Paul Ip
(74) *Attorney, Agent, or Firm* — Caesar, Rivise, Berstein, Cohen & Pokotilow, Ltd.

(57) ABSTRACT

A motor controller that outputs a drive signal to a direct-current brush motor to drive the motor is provided. The motor controller includes a drive signal generating section that generates the drive signal. The drive signal generating section generates the drive signal by superimposing on a direct-current voltage a compensation voltage for generating a compensation torque that can cancel rotation torque fluctuations in a no-load rotation state of the motor.

5 Claims, 1 Drawing Sheet

MOTOR CONTROLLER

FIELD OF THE INVENTION

The present invention relates to a motor controller that is suitable for reducing operating noise of a direct-current motor.

BACKGROUND OF THE INVENTION

Conventionally, noise reduction of motors has been attempted, for example, by reducing the operating noise of motors. Generally, motors are designed in an optimal manner to reduce noise by selecting the materials and shapes of components that affect the resonant frequencies of the components and the number of poles of the motor. However, it is difficult and troublesome to reduce noise of motors by optimizing only the mechanical features of the components.

For example, Japanese Laid-Open Patent Publication No. 2007-1366 discloses a technology for reducing the operating noise of a motor through electric control, namely, by adjusting the direct-current voltage supplied to the motor.

Minute torque fluctuations in one revolution of a motor is one of the causes of motor vibration. However, the above publication does not provides no concrete solution against such minute torque fluctuations. Thus, it is considered that motor vibration caused by minute torque fluctuations is not sufficiently reduced. There is room for improvement in technologies for reducing noise.

SUMMARY OF THE INVENTION

Accordingly, it is an objective of the present invention to provide a motor controller that is capable of reducing noise of the motor.

To achieve the foregoing objective and in accordance with a first aspect of the present invention, a motor controller that outputs a drive signal to a direct-current brush motor to drive the motor is provided. The motor controller includes a drive signal generating section that generates the drive signal by superimposing on a direct-current voltage a compensation voltage for generating a compensation torque that can cancel torque fluctuations in a no-load rotation state of the motor.

In accordance with a second aspect of the present invention, a method for controlling a direct-current brush motor is provided. The method includes generating a drive signal output to the motor to drive the motor. The drive signal is generated by superimposing on a direct-current voltage a compensation voltage for generating a compensation torque that can cancel torque fluctuations in a no-load rotation state of the motor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIG. 1 and FIG. 2.

Figure 1:
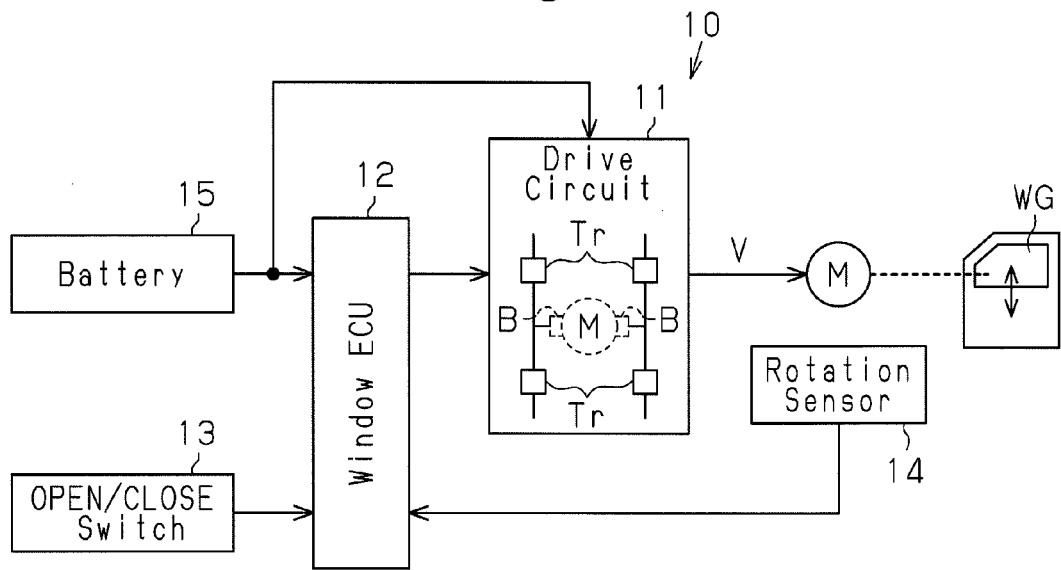
FIG. 1 is an electric block diagram showing a motor controller according to one embodiment of the present invention.
Figure 2:
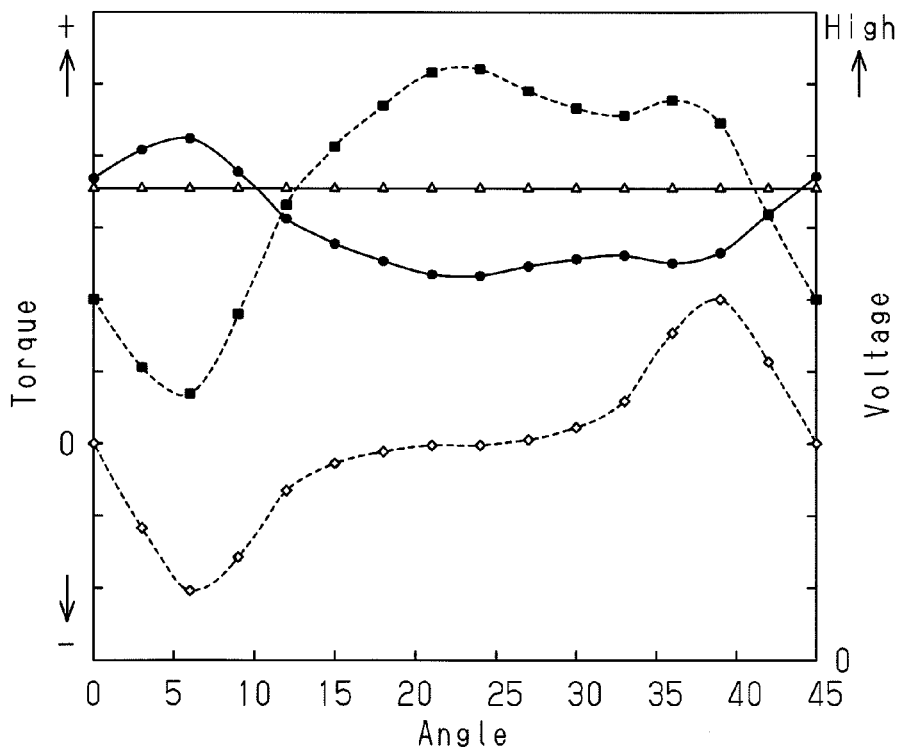
FIG. 2 is a waveform chart of a drive signal supplied to the motor shown in FIG. 1.

As shown in FIG. 1, a motor controller 10 according to the present embodiment controls a motor M that drives a power window system of a vehicle. The motor controller 10 includes a drive circuit 11 that generates a drive signal (drive voltage) for driving the motor M and a window ECU 12 for controlling the drive circuit 11. Based on an OPEN/CLOSE signal from an OPEN/CLOSE switch 13, the window ECU 12 causes the motor M to rotate in a forward direction or a reverse direction through the drive circuit 11, thereby opening or closing a window glass WG. Based on a rotation detection signal supplied by a rotation sensor 14, the window ECU 12 detects the rotation direction and rotation speed of the motor M, and reflects the detection results on the control of the motor M.

The drive circuit 11, which serves as a drive signal generating section, has an H bridge circuit including a plurality of switching elements Tr. To cause the motor M to rotate in the forward or reverse direction, the switching elements Tr are turned on or off based on a control signal from the window ECU 12 serving as a control section. Based on turning on and off of the switching elements Tr, the drive circuit 11 generates the drive signal using a direct-current voltage supplied by a battery 15, and supplies the drive signal to the motor M. The window ECU 12 performs PWM control for each switching element Tr.

The motor M of the present embodiment has a stator with a plurality of magnets and a rotating armature that is rotatable relative to the stator. The rotating armature has an armature core with a plurality of teeth and an armature coil wound about the teeth. The armature coil is connected to a commutator, which rotates integrally with the rotating armature. The motor M has power supply brushes B that slide on the commutator. That is, the motor M of the present embodiment is a direct-current brush motor. When a drive signal V is supplied to the armature coil through the brushes B, the rotating armature rotates. When the direct-current motor M is, for example, in a no-load rotating state, a drive signal V having a certain magnitude supplied to the armature coil generates torque fluctuation in the motor M due to braking torque generated by short-circuiting between the brushes and the armature coil, changes in the amount of flux of the magnets, and cogging torque generated between the magnets and the armature core. In FIG. 2, rotational torque before compensation is performed, that is, rotational torque in a case where a drive signal V of a certain magnitude is supplied to the armature coil in a no-load state is plotted with solid squares, and cogging torque contained in the rotational torque before compensation is plotted with blank diamonds. FIG. 2 shows patterns of torque fluctuations in a range of rotation angle from 0° to 45° of the rotating armature. In the motor M of the present embodiment, the torque fluctuations of these patterns appear periodically every 45°.

A compensation voltage used to control the motor M is obtained in advance, for example, through simulations. The compensation voltage generates compensation torque that cancels torque fluctuations of the motor M in a no-load rotation state, that is, fluctuations of the rotational torque before compensation shown in FIG. 2. The compensation voltage is determined in correspondence with the rotation angle. The window ECU 12 changes the duty cycle of PWM control for each switching element Tr of the drive circuit 11 based on the compensation voltage. Accordingly, the drive circuit 11 superimposes the compensation voltage on a direct-current voltage from the battery 15, thereby generating a drive signal V plotted with solid circles in FIG. 2, and supplies the drive signal V to the motor M. At this time, the window ECU 12 changes the duty cycle of the PWM control while maintaining the carrier frequency at a constant value. When supplied with the drive signal V, the motor M generates substantially constant torque as plotted with blank triangles in FIG. 2 in relation to the rotation angle of the rotating armature, which reduces the vibration of the motor M. Accordingly, the noise during opening or closing of the window glass WG is reliably reduced.

The present embodiment has the following advantages.

(1) In the present embodiment, the drive voltage V is generated by superimposing on a direct-current voltage the compensation voltage for generating the compensation torque that can cancel rotation torque fluctuations in a no-load rotation state, and the resultant drive voltage V is supplied to the motor M. Thus, the torque of the motor M is stabilized as shown in FIG. 2, and the motor M operates with a low vibration. Accordingly, the noise during opening or closing of the window glass WG is reliably reduced in the present embodiment.

(2) In the present embodiment, the duty cycle of the PWM control performed on the switching elements Tr of the drive circuit 11 is changed in consideration of torque fluctuation in a no-load rotation state, thereby generating the drive signal V by superimposing a compensation voltage on a direct-current voltage. Therefore, the drive signal V, on which the compensation voltage that can cancel torque fluctuations is superimposed, is easily generated simply by changing the duty cycle of the PWM control.

(3) In the present embodiment, the drive signal V is generated, on which the compensation voltage is superimposed that can cancel torque fluctuation generated by three factors, or braking torque generated by short-circuiting between the brushes B and the armature coil, changes in the amount of flux of the magnets, and cogging torque generated between the magnets and the armature core. Therefore, according to the present embodiment, torque fluctuation containing all these factors is cancelled, and the vibration and noise of the motor M are reliably reduced.

The above embodiment of the present invention may be modified as follows.

In the above embodiment, the drive signal V is generated by changing the duty cycle of the switching elements Tr with a constant carrier frequency of the PWM control. However, the drive signal V may be generated by changing the carrier frequency with a constant duty cycle. Also, the drive signal V can be easily generated by causing the window ECU 12 to change the on-state resistance of the switching elements Tr in accordance with rotation torque fluctuation in a no-load rotation state. Alternatively, the motor controller 10 may include means for generating a drive signal V without using the switching elements Tr.

In the above embodiment, the opening-closing speed of the window glass WG is controlled to be substantially constant. However, the opening-closing speed of the window glass WG may be changed in accordance with its position.

The drive signal V may be changed as long as it contains a compensation voltage for canceling torque fluctuation generated by at least one of braking torque generated by short-circuiting between the brushes B and the armature coil, changes in the amount of flux of the magnets, and cogging torque generated between the magnets and the armature core.

The rotation sensor 14 may include a hall element and a sensor magnet. Alternatively, the rotation sensor 14 may detect the rotation angle of the rotating armature by detecting the current supplied to the motor M.

Since torque fluctuation of the motor M varies depending on its configuration, the drive signal V may be set so as to contain compensation voltage that corresponds to the torque fluctuation for the configuration of each motor M. Even in the case of the motors M of the same configuration, the motors M have slightly different torque fluctuation characteristics. The drive signal V thus may be determined for each motor M.

In the above embodiment, the controlled object is the motor M, which is used for opening and closing the window glass WG. However, the present invention may be used to control any motor that actuates an opening and closing body of a vehicle. The controlled object may be other type of motor.

What is claimed is:

1. A motor controller that outputs a drive signal comprising a direct current voltage to a direct-current brush motor to drive the motor, the motor having a no-load rotational state and comprising a brush to which the direct current voltage supplied by a battery is applied, the motor controller comprising:
a drive signal generating section that generates the drive signal by superimposing on the direct-current voltage a compensation voltage, the compensation voltage generating a compensation torque to cancel torque fluctuations in the no-load rotation state of the motor.

2. The motor controller according to claim 1, wherein the drive signal generating section includes at least one switching element, wherein the motor controller further comprising a control section that controls the at least one switching element, and wherein the control section performs PWM control on the switching element or changes to on-state resistance of the switching element, so that the drive signal generating section generates the drive signal.

3. The motor controller according to claim 1, wherein the motor comprises an armature coil, brushes and magnets and wherein the compensation voltage generates a compensation torque to cancel torque fluctuation generated by at least one of braking torque generated by short-circuiting between the armature coil and brushes, changes in the amount of flux of the magnets, and cogging torque generated between the magnets and the armature core.

4. The motor controller according to claim 1, wherein the motor actuates an opening and closing body provided in a vehicle.

5. A method for controlling a direct-current brush motor having a no-load rotational state and comprising a brush to which a direct current voltage supplied by a battery is applied, the method, comprising:
generating a drive signal output to the motor to drive the motor, wherein the drive signal is generated by superimposing on the direct-current voltage a compensation voltage, the compensation voltage generating a compensation torque to cancel torque fluctuations in the no-load rotation state of the motor.

\* \* \* \* \*